Figure 1:
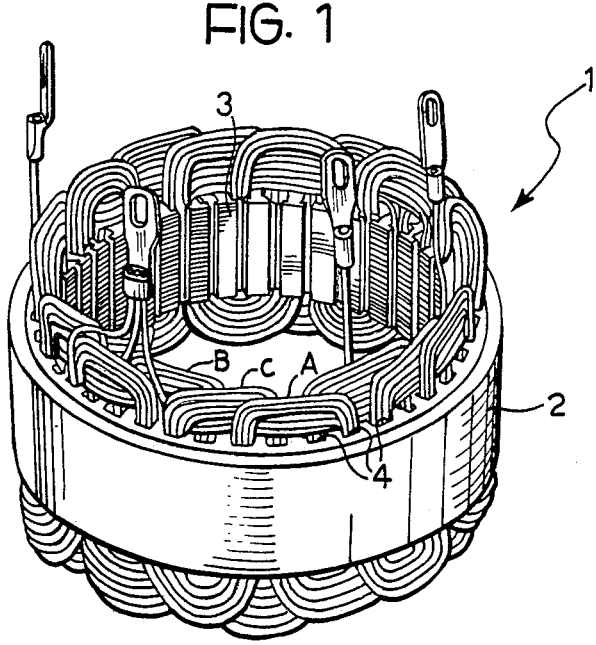

United States Patent [19]
Barrera

[11] Patent Number: 4,741,098
[45] Date of Patent: May 3, 1988

[54] DEVICE FOR INSERTING PREWOUND COILS IN THE CAVITIES OF A STATOR OF A DYNAMO-ELECTRIC MACHINE AND APPARATUS USING SUCH A DEVICE

[75] Inventor: Giorgio Barrera, Leumann, Italy

[73] Assignee: Officine Meccaniche Pavesi & C. S.p.A., Cascine Vica, Italy

[21] Appl. No.: 895,635

[22] Filed: Aug. 12, 1986

[30] Foreign Application Priority Data

Nov. 5, 1985 [IT] Italy ............... 67927 A/85

[51] Int. Cl.⁴ .................. H02K 15/02; H02K 15/08; H02K 15/09
[52] U.S. Cl. .................................... 29/736; 29/596; 29/606; 29/734
[58] Field of Search ............... 29/596, 606, 732, 734, 29/736

[56] References Cited

U.S. PATENT DOCUMENTS

| | | | |
|---|---|---|---|
| 3,324,536 | 6/1967 | Hill | 29/606 |
| 3,593,405 | 7/1971 | Hahn | 29/736 |
| 3,672,039 | 6/1972 | Arnold | 29/606 X |
| 3,857,171 | 12/1974 | Lund | 29/606 X |
| 3,913,373 | 10/1975 | Kindig | 29/736 X |
| 4,455,743 | 6/1984 | Witwer et al. | 29/734 X |

FOREIGN PATENT DOCUMENTS 1210481 10/1970 United Kingdom ............... 29/736

Primary Examiner—Howard N. Goldberg
Assistant Examiner—Taylor J. Ross
Attorney, Agent, or Firm—Sughrue, Mion, Zinn, Macpeak & Seas

[57] ABSTRACT

In a device for inserting prewound coils in the cavities of a stator of a dynamo-electric machine, of the type comprising an annular series of coil guide blades for receiving the prewound coils to be inserted in the cavities of the stator, an annular series of key guide blades surrounding the series of coil guide blades, and a thrust member slidable axially into the series of coil guide blades to insert the coils in the stator cavities, there are also provided an outer auxiliary coil guide member having an annular body locatable around the key guide blades and having an inner surface spaced from the outer surface of the key guide blades so as to define a first annular passage for guiding the coils during the insertion operation, and an inner auxiliary coil guide member movable with the thrust member into the series of coil guide blades and having an outer surface spaced from the inner surface of the coil guide blades so as to define a second annular passage for guiding the coils during the insertion operation.

6 Claims, 8 Drawing Sheets

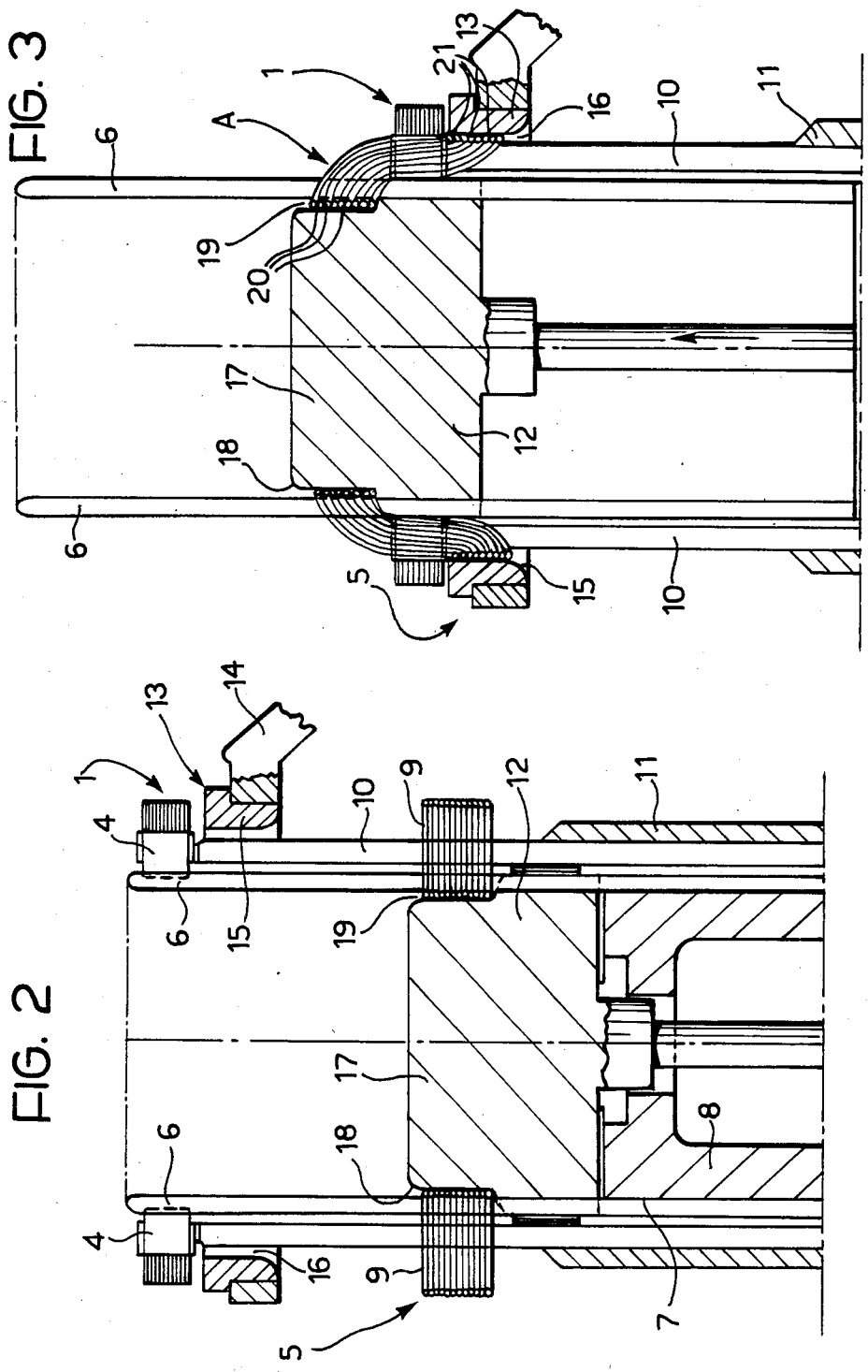

DEVICE FOR INSERTING PREWOUND COILS IN THE CAVITIES OF A STATOR OF A DYNAMO-ELECTRIC MACHINE AND APPARATUS USING SUCH A DEVICE

The present invention relates to devices for inserting prewound coils in the cavities of a stator of a dynamo-electric machine of the type comprising:

an annular series of coil guide blades, a support for the blades, having a cylindrical body with a circumferential series of longitudinal slots in which the coil guide blades are located, these blades having end portions projecting axially from the support for receiving the prewound coils to be inserted in the cavities of the stator, an annular series of key guide blades surrounding the series of coil guide blades, and a thrust member slidable axially into the series of coil guide blades to insert the coils in the stator cavities.

A device of the type specified above is described and illustrated, for example, in U.S Pat. No. 3,324,536. The term "key" which appears in the present specification and in the following claims is used by experts in the art to indicate each of the inserts, usually U-shaped, of insulating material with which the cavities of the stator are closed to protect the prewound coils inserted therein.

The object of the invention is to provide a device of the type specified above which enables the prewound coils to be inserted in the cavities of the stator of a dynamo-electric machine with the turns of a coil superposed on each other so that the radial dimension of the coil corresponds substantially to the thickness of the wire constituting the coil. Such an arrangement of the coils is in fact desired in applications (such as, alternators for motor vehicles) in which it is essential to achieve good dissipation of the heat generated by the dynamo-electric machine.

In order to achieve this object, the invention provides a device of the type specified above, characterised in that it further includes:

an outer auxiliary coil guide member having an annular body locatable around the key guide blades and having an inner surface spaced from the outer surface of the key guide blades so as to define a first annular passage for guiding the coils during the insertion operation, and an inner auxiliary coil guide member movable with the thrust member into the series of coil guide blades and having an outer surface spaced from the inner surface of the coil guide blades so as to define a second annular passage for guiding the coils during the insertion operation.

According to a further characteristic, the distance between the outer surface of the inner auxiliary coil guide member and the cylindrical surface touching the inside of the series of coil guide blades is substantially equal to the thickness of the wire constituting the coils.

The invention also provides insertion apparatus including a plurality of devices of the type specified above.

In a first device forming part of the apparatus of the invention, the distance between the inner surface of the outer auxiliary coil guide member and the outer surface of the key guide blades is substantially equal to the thickness of the wire constituting the coils.

In each of the remaining insertion devices forming part of the insertion apparatus of the invention, each useable for inserting a prewound coil in the cavities of a stator in which a coil has already been inserted, the distance between the outer surface of the key guide blades and the turns of the previously inserted coil, which bear on the inner surface of the outer auxiliary coil guide member, is substantially equal to the thickness of the wire constituting the coils.

According to a further characteristic of the invention, the insertion apparatus also includes a tool for straightening the inserted coils, including:

means for supporting the stator, abutment means defining a cylindrical abutment surface for the coils already inserted in the stator, on the notional extension of the bottom of the cavities of the stator beyond the two ends of the latter, and a plurality of thrust members movable radially into the stator to press the parts the coil which project beyond the two ends of the stator against the abutment surface.

Figure 12:
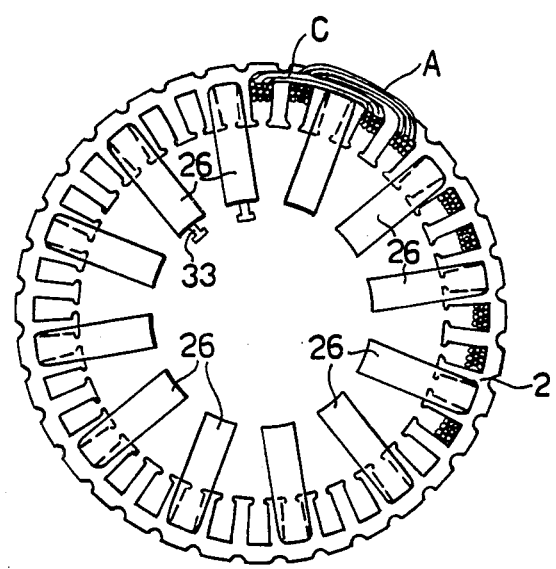
Figure 4:
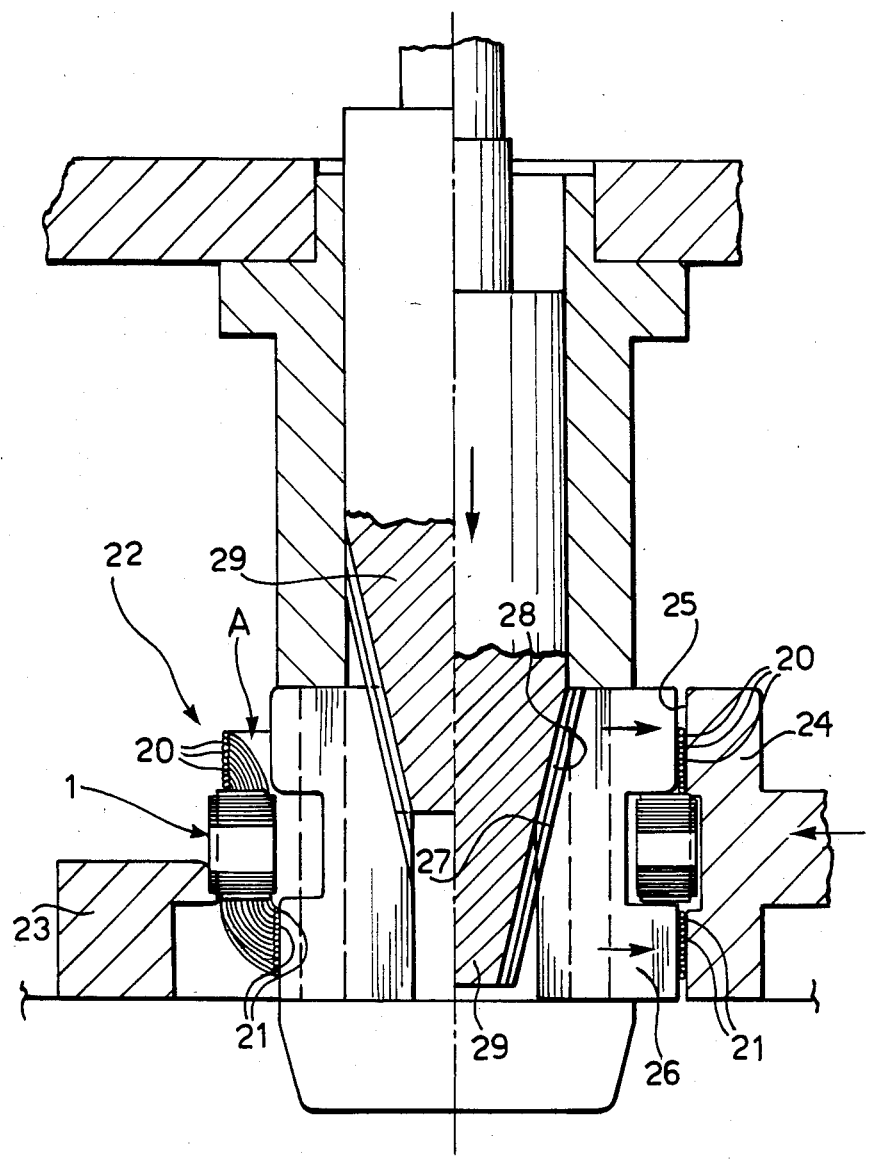
Figure 6:
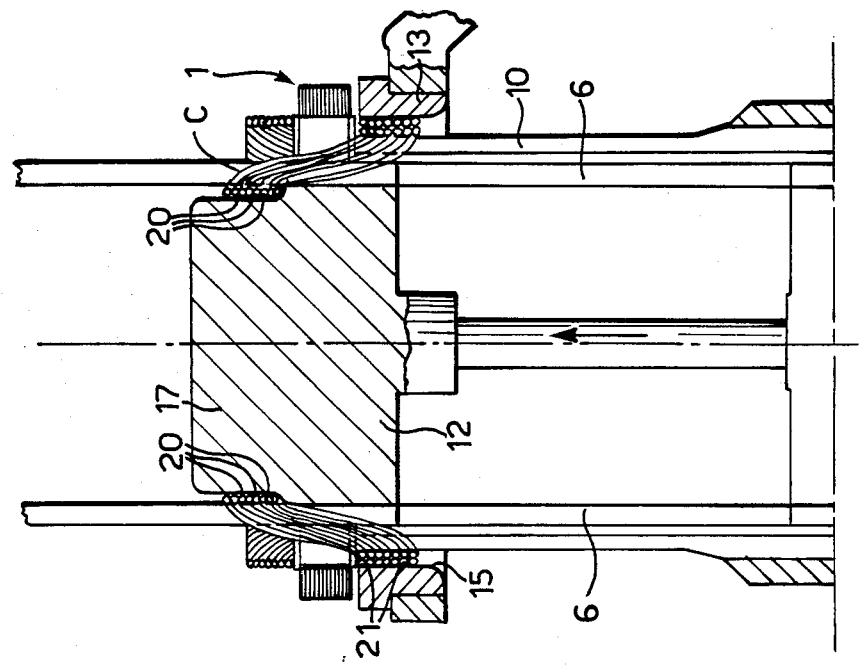
Figure 5:
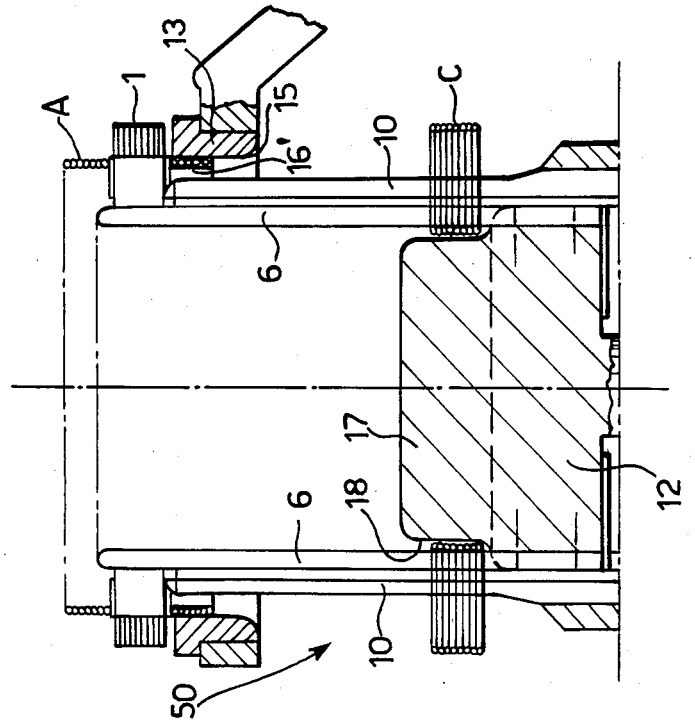
Figure 7:
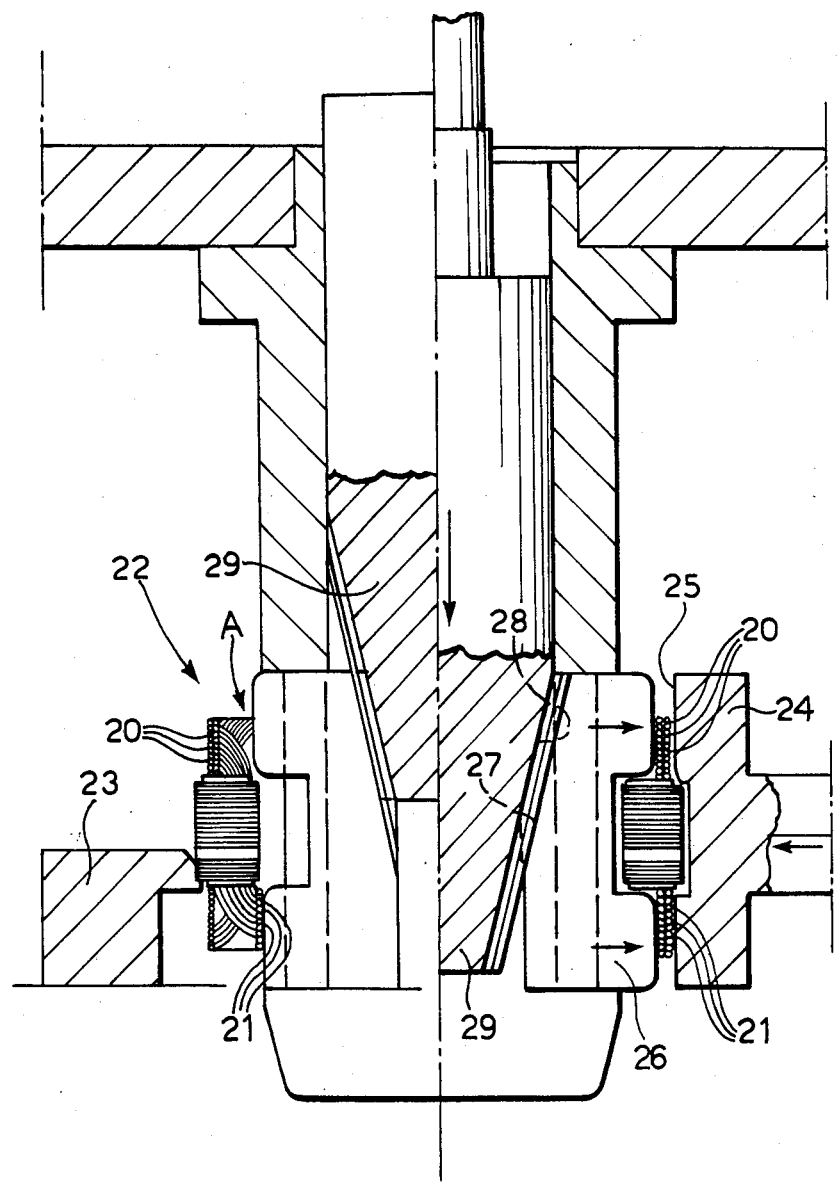
Figure 9:
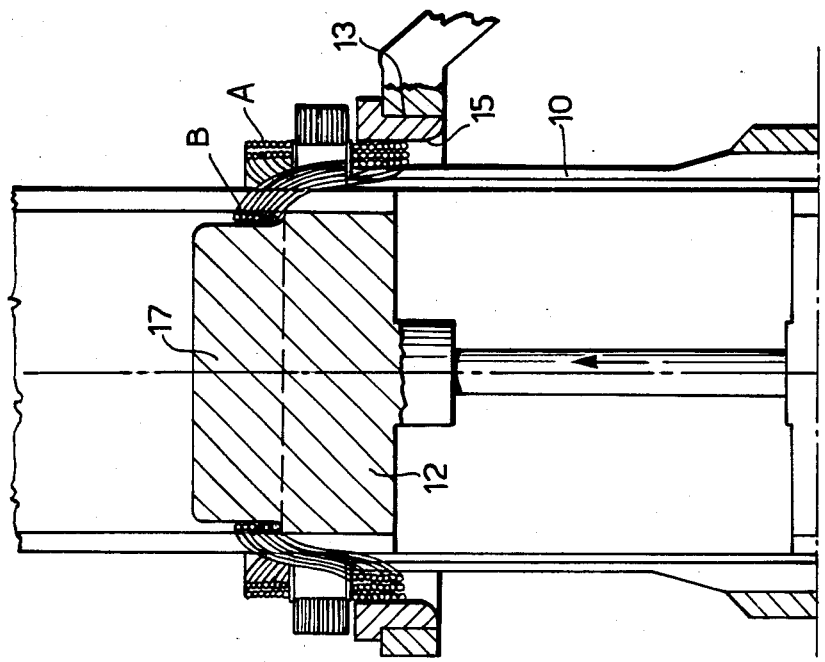
Figure 8:
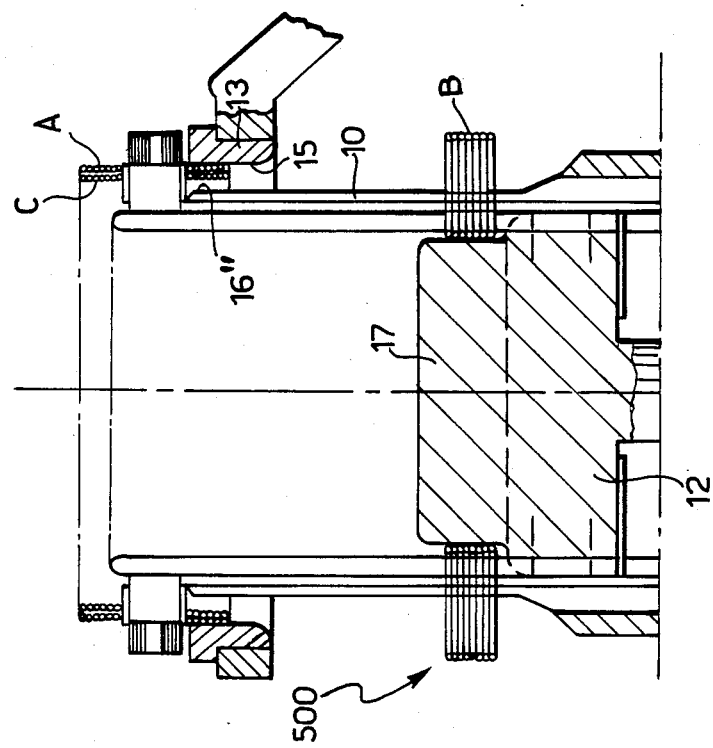
Figure 10:
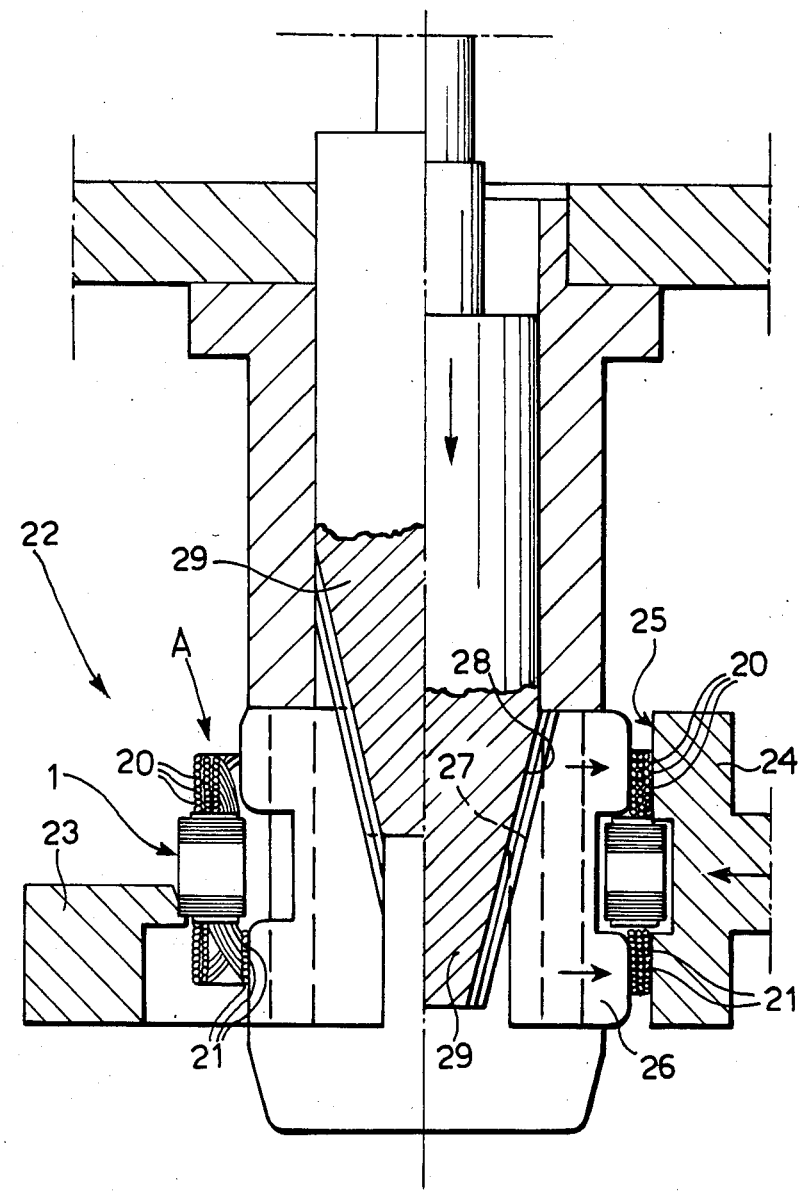
Figure 11:
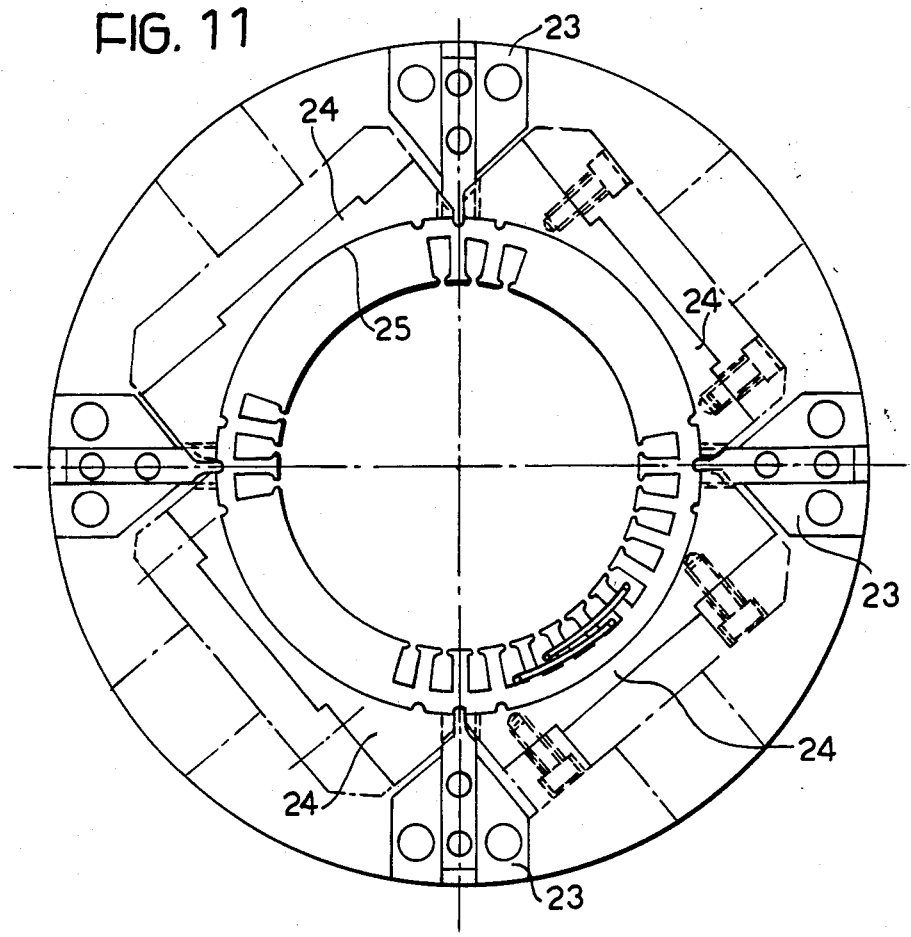
Figure 13:
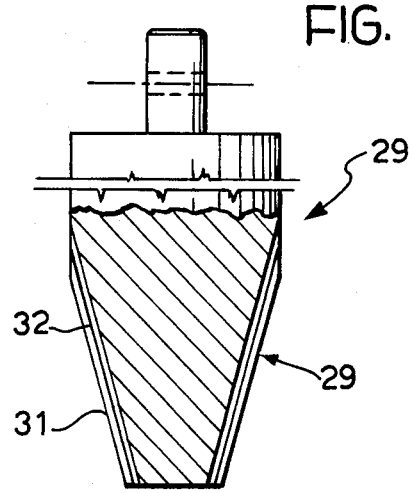

The present invention will now be described with reference to the appended drawings, provided purely by way of non-limiting example, in which:

FIG. 1 is a perspective view of a stator having a series of coils inserted by means of the apparatus of the invention, FIGS. 2 and 3 are partially-sectioned schematic views of a first device forming part of the apparatus of the invention, in two different operating conditions, FIG. 4 is a schematic sectional view of a coil straightening tool forming part of the apparatus according to the invention, FIGS. 5 and 6 are partially-sectioned schematic views of a second device forming part of the apparatus of the invention, illustrated in two different operating conditions, FIG. 7 illustrates the tool of FIG. 4 in another operating condition, FIGS. 8 and 9 are partially-sectioned schematic views of a third device forming part of the apparatus of the invention, illustrated in two different operating conditions, FIG. 10 is a schematic sectional view of the tool of FIG. 4 in a further operating condition, FIG. 11 is a schematic plan view of a detail of FIG. 4, FIG. 12 is a schematic plan view of a further detail of FIG. 4, and FIG. 13 illustrates a detail of FIG. 4.

With reference to FIG. 1, a stator for a dynamo-electric machine, particularly an alternator for motor vehicles, is generally indicated 1. The stator 1 has an annular laminated body 2 with an inner surface 3 having a plurality of longitudinal cavities 4 in which the coils constituting the winding of the stator are inserted. The embodiment illustrated relates to the case in which the coils are of the type termed "undulate" by experts in the art. Moreover, the stator has three coils of this type. A first coil, indicated A, has its turns in direct contact with the bottom of the cavities 3. It is thus in the radially outermost position relative to the axis of the stator. A second coil, indicated B, is located with its turns directly facing the internal cavity of the stator. It is thus in the radially innermost position relative to the axis of the stator. Finally, a third coil, indicated C, is in the radially intermediate position between the outer coil A and the inner coil B.

The apparatus according to the invention provides for the successive insertion firstly of the outer coil A, then of the intermediate coil C, and finally of the innermost coil B into the cavities 4 of the stator 1.

In FIGS. 2 and 3, a first insertion device forming part of the apparatus of the invention is generally indicated 5. This device is of the known type illustrated, for example, in U.S. Pat. No. 3,324,536. The constructional details of the device which do not fall within the scope of the present invention are not illustrated in detail in that they are known per se (see the cited U.S. Patent) and in that their elimination from the drawings renders the latter readier and easier to understand.

The device 5 comprises a series of coil guide blades 6 disposed within longitudinal slots 7 in a blade holder support 8. The blades 6 have end portions which project from the blade holder support 8 and receive the turns 9 of the undulate coil A for insertion in the cavities 4 of the stator. According to the current art, the device further includes a series of key guide blades 10 surrounding the series of coil guide blades 6. The key guide blades 10 also have end portions projecting beyond the blade holder support 8. However, these end portions of the blades 10 are shorter than those of the corresponding portions of the blades 6. According to the current art, therefore, it is possible to locate the stator 1 around the ends of the blades 6, the stator resting on the ends of the blades 10 as illustrated in FIG. 2. Again according to the prior art, the key guide blades 10 are surrounded by an outer bush 11. Within the series of blades 6 there is also slidable axially a thrust member 12 which can be driven by means of known type (not illustrated) so as to move between a lowered inoperative position (illustrated in FIG. 2) and a raised operative position (illustrated in FIG. 3) in which it causes the coil A to be inserted in the cavities 4 of the stator. During the raising of the member 12, the blades 6 are also moved upwardly by control means of known type (not illustrated) located in the lower part of the device.

As seen from FIG. 1, the coils inserted in the cavities of the stator by the apparatus of the invention are located with the turns superposed on each other on a substantially cylindrical surface coaxial with the stator, so that the radial dimension of each coil is substantially equal to the thickness of the wire constituting the coils. By virtue of this arrangement, the heat generated during operation of the dynamo-electric machine may be dissipated more easily.

In order to achieve the objective of locating the coil A in the manner illustrated in FIG. 1, the device 5 has an outer auxiliary coil guide member 13 constituted by a ring which is supported by a support tool 14 of any type (illustrated schematically and partially in the drawing) so as to surround the ends of the key guide blades 10. Clearly, the ring 13 is positioned before the stator 1 is placed in the position illustrated in FIG. 2.

The ring 13 has an inner surface 15 spaced from the outer surface of the blades 10 so as to define an annular guide passage 16 for the coils. In the case of the device 5 intended to insert the outer coil A in the cavities of the stator, the radial dimension of the annular passage 16 corresponds substantially to the thickness of the wire constituting the coil A.

The device 5 also has an inner auxiliary guide member 17 constituted by a cylindrical portion projecting upwardly from the thrust member 12 and having an outer surface 18 spaced from the inner surface of the coil guide blades 6 so as to define an annular passage 19 for guiding the coil A. The radial dimension of the annular passage 19 defined between the outer cylindrical surface 18 of the portion 17 and the notional cylindrical surface touching the insides of the coil guide blades 6 is substantially equal to the thickness of the wire constituting the coil A.

By virtue of the arrangement described above, when the thrust member 12 is moved into its operative position (see FIG. 3) to cause the insertion of the coil A in the cavities 4 of the stator, the portions of the turns which constitute the horizontal arms (with reference to FIG. 1) of the undulate coil A are forced to locate themselves one above the other, having to engage the annular guide passages 16 and 19. However, at the end of this insertion, the coil A is not still in the condition illustrated in FIG. 1, in that the parts of the coil which project above the stator (with reference to FIG. 3) are bent inwardly of the stator. At this point, therefore, it is necessary to straighten the turns of the coil, bringing the portions of the turns indicated 20 in FIG. 3 substantially to the same distance from the axis of the stator as those portions of the turns indicated 21.

For this purpose, the stator, with the coil so wound, is located in an upside-down position in a coil straightening tool 22 which is illustrated schematically in FIGS. 4, 11, 12 and 13.

In the embodiment illustrated, the tool 22 comprises four supports 23 (see also FIG. 11) on which the stator 1 rests. The left-hand half of FIG. 4 illustrates the stator in the initial condition, before the coil has been straightened by the tool 22. The tool comprises coil abutment means constituted by four equiangularly-spaced sectors 24 which are movable radially between an inoperative outermost position and an operative innermost position in which their facing ends define a continuous cylindrical surface 25 for supporting the coils, beyond the two ends of the stator.

Within the four sectors 24 is a plurality of thrust members 26 (see also FIG. 12) which are movable radially between an innermost inoperative position and an outermost operative position in which these thrust members 26 press the turn portions 20 and 21 of the coil A against the abutment surface 25 defined by the four sectors 24 when these are in their operative position. Each thrust member 26 has an inclined plane 27 cooperating with a corresponding inclined plane 28 of a common actuator member 29 movable axially between a raised inoperative position and a lowered operative position in which it presses the thrust members 26 outwardly.

As illustrated in FIG. 13, the actuator member 29 includes a tapered active part 30 with a series of flat surfaces 31 each having a longitudinal T-sectioned cavity 32 which is engaged by a rib 33 (see FIG. 12) of corresponding section, carried by a corresponding thrust member 26. The member 29 is illustrated schematically in its inoperative position in the left-hand half of FIG. 4, while it is illustrated in its operative position in the right-hand half, a thrust member 26 pressing the turns 20 and 21 against the abutment surface 25 defined by the sectors 24.

At the end of this operation, therefore, the horizontal arms of the undulate coil A are al substantially contained within the same cylindrical surface concentric with the stator, the various turns of the horizontal portions of the coil (with reference to FIG. 1) all being superposed on each other in a direction parallel to the axis of the stator whereby the radial dimension of the coil is substantially equal to the thickness of the wire constituting it.

At the end of the operation described above, it is possible to insert the intermediate coil C by a second device 50 entirely similar to the device 5 of FIGS. 2 and 3. In FIGS. 5 and 6, the parts corresponding to those of FIGS. 2 and 3 are indicated by the same reference numerals. The sole difference between the device 50 and the device 5 lies in the fact that the key guide blades 10 have a smaller radius whereby the radial passage 16' defined between the outer surface of the blades 10 and the turns of the coil A which bear against the inner surface of ring 13 is again substantially equal to the thickness of the wire constituting the coil C. By virtue of this characteristic, the operation of the device 50 is entirely similar to that of the device 5. More particularly, the movement of the thrust member 12 into its operative position (see FIG. 6) causes the coil C to be inserted and at the same time forces the portions 20, 21 of the turns constituting the horizontal arms of the coil (with reference to FIG. 1) to be located one above the other in a direction parallel to the axis of the stator.

After the insertion of the coil C, it is again necessary to straighten the coil C, which has parts projecting above the stator 1 (with reference to FIG. 6) the stator 1 projecting inwardly of the stator.

Thus, the stator 1 is again located in an upside-down position in the tool 22 where the thrust members 26 squash the turn portions 20, 21 of the coil C against the abutment surface 25 so as to locate the coil C in the condition illustrated in FIG. 1.

The insertion of the coil B is achieved by a third insertion device 500 (see FIGS. 8 and 9) entirely similar to the devices 5, 50 except for the sole difference that the key guide blades 10 have an even smaller radius. By virtue of this characteristic, the annular passage 16" between the outer surface of the key guide blades 10 and of the turns of the coil C already inserted, which bear against the inner surface 15 of the ring 13, is again substantially equal to the thickness of the wire constituting the coils. Once the insertion of the coil B (FIG. 9) has been completed, it is necessary to place this stator 1 in an upside-down position in the straightening tool 22 for the last time, to achieve the arrangement of the coil B illustrated in FIG. 1.

Naturally, the principle of the invention remaining the same, the constructional details and forms of embodiment may be varied widely with respect to that described and illustrated purely by way of example, without thereby departing from the scope of the present invention.

I claim:

1. Device for inserting prewound coils in the cavities of a stator of a dynamo-electric machine, comprising:
    an annular series of coil guide blades (6),
    a support (8) for the blades (6), having a cylindrical body with a circumferential series of longitudinal slots (7) in which the coil guide blades (8) are located, these blades (6) having end portions projecting axially from the support (8) for receiving the prewound coils (A,B,C) to be inserted in the cavities (4) of the stator (1),
    an annular series of key guide blades (10) surrounding the series of coil guide blades (6),
    a thrust member (12) slidable axially into the series of coil guide blades (6) to insert the coils in the stator cavities,
    an outer auxiliary coil guide member (13) having an annular body locatable around the key guide blades (10) and having an inner surface (15) spaced from the outer surface of the key guide blades (10) so as to define a first annular passage (16) for guiding the coils during the insertion operation, and
    an inner auxiliary coil guide member (17) movable with the thrust member (12) into the series of coil passage (19) for guiding the coils during the insertion opeation, wherein the distance between the outer surface (18) of the inner auxiliary coil guide member (17) and the cylindrical surface touching the inside of the series of coil guide blades (6) is substantially equal to the thickness of the wire constituting the coils.

2. Device according to claim 1, wherein the distance between the inner surface of the outer auxiliary coil guide member (13) and the outer surface of the key guide blades (10) is substantially equal to the thickness of the wire constituting the coils.

3. Device according to claim 1, useable for inserting a prewound coil in the cavities of a stator in which a coil has already been inserted, wherein the distance between the outer surface of the key guide blades (10) and the turns of the previously inserted coil, which bear on the inner surface (15) of the outer auxiliary coil guide member (13), is substantially equal to the thickness of the wire constituting the coils.

4. Apparatus for inserting prewound coils in the cavities of a stator of a dynamo-electric machine, including at least one insertion device according to claim 1, and a tool for straightening the inserted coils, comprising:
    means (23) for supporting the stator (1) having at least one coil already inserted in its cavities,
    abutment means (24) defining a cylindrical coil abutment surface (25) beyond the two ends of the stator,
    a plurality of thrust members (26) movable radially within the cylindrical abutment surface (25) to press the parts of the coil which project beyond the two ends of the stator against this abutment surface (25).

5. Apparatus according to claim 4, wherein the abutment means comprise a plurality of equiangularly-spaced sectors (24) movable radially between a radially-outermost inoperative position and a radially-innermost operative position in which their facing ends define the cylindrical abutment surface (25).

6. Apparatus according to claim 4, wherein each thrust member (26) has an inclined plane (27) cooperating with a corresponding inclined plane (28) of a common actuator member (29) movable axially between the thrust members (26).

* * * * *